June 12, 1945. F. M. ASPIN 2,378,120
ROTARY VALVES FOR INTERNAL-COMBUSTION ENGINES
Filed May 19, 1943

INVENTOR:
Frank M. Aspin.
By Attorney: Walter Gunn.

Patented June 12, 1945

2,378,120

UNITED STATES PATENT OFFICE 2,378,120

ROTARY VALVE FOR INTERNAL-COMBUSTION ENGINES

Frank Metcalf Aspin, Bury, England

Application May 19, 1943, Serial No. 487,613
In Great Britain May 27, 1942

7 Claims. (Cl. 123—80)

This invention relates to rotary valves for internal combustion engines of the kind in which the rotary valve member is axially loaded by gaseous pressures within the cylinder in a direction to vary the loading between the gas sealing surfaces of the rotary valve member and its seating. An example of a rotary valve construction of such kind is described in the specification of my prior Patent No. 2,283,594, and this invention is particularly, though not exclusively, applicable to the valve construction of my aforesaid earlier patent.

The invention may also conveniently embody the construction described in my co-pending application for Patent Serial No. 487,614 in which the cylinder head and valve is embodied in a plug-like unit fitting and adapted to be secured in the end or integral extension of the engine cylinder.

The subjects of lubrication and bearing loads of a rotary valve of the kind referred to are major problems.

Loading of the gas sealing bearing surfaces, beyond that which is necessary to maintain the gas seal, increases friction at the bearing surfaces and entails more lubrication and the object of the present invention is an improved construction to enable the loading at such surfaces to be limited to a pre-determined maximum and substantially unrelated to the loading on the valve due to gaseous pressures in the cylinder.

In the accompanying drawing.

Figure 1:
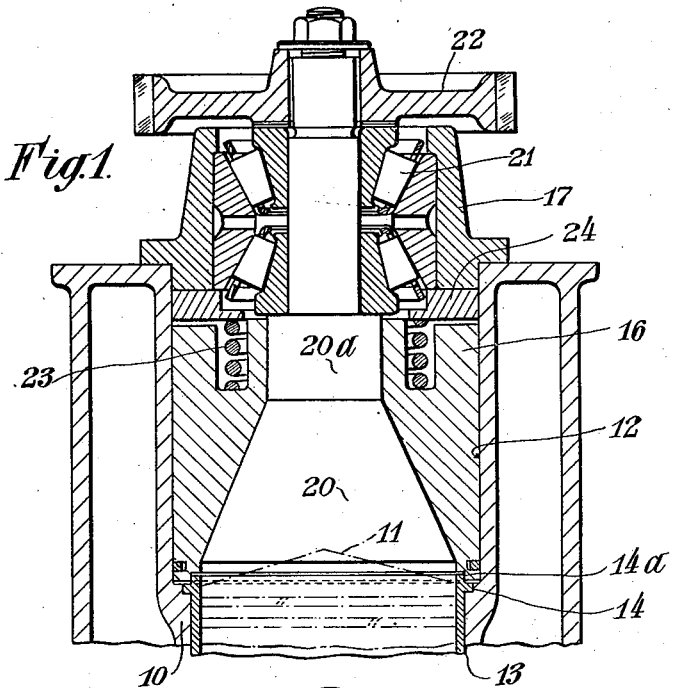
Fig. 1 is a sectional elevation showing one example of the invention.

In the example of the invention shown in the drawing the cylinder 10 is extended above the limit of travel of the piston 11 for a distance approximately equal to the diameter of the bore of the cylinder, and the bore 12 of such extension is larger than that of the cylinder so as to form an annular shoulder. The cylinder bore is fitted with a liner 13 which is flanged at its upper end, such flange 14 being located against the aforesaid shoulder. The cylinder is shown having a space 15 for a coolant fluid. In the bore of the upper end of the cylinder is located a plug-like unit 16 which is a sliding fit whilst being held against rotation by any suitable means and embodies the rotary valve housing, the rotary valve member 20 being of the conical type seating in a conical recess in the plug. In the rotary valve member is an off-set combustion space not shown but constructed as described in the specification of my aforesaid earlier Patent No. 2,283,594, whilst in the plug and in the extension of the cylinder, though not shown, are registering inlet and exhaust ports and a "sparking plug" hole. The upper end of the cylinder line has a small cylindrical upstanding flange 14a above its locating end flange 14 whilst the lower end of the plug-like unit has an annular recess which fits closely over such upstanding flange 14a to form a gas seal. The stem 20a of the valve above its conical portion is cylindrical and is a good bearing fit in the plug-like part.

The plug-like unit 16 is secured in the end of the cylinder by a flanged ring 17, fitting over it and secured by suitable studs 18 and holding a pair of taper roller anti-friction thrust bearings 21. The flanged ring also houses a compression spring 23 located between a washer 24 and the upper end of the plug-like unit 16. A driving gear 22 is located on the end of the valve.

Figure 2:
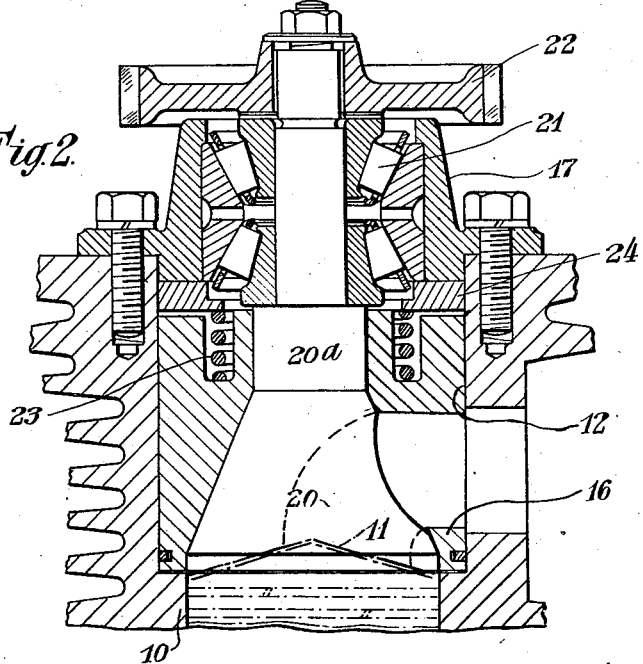
Fig. 2 is a similar view of a modified construction.

As shown in Fig. 1, the cylinder, cylinder extension and plug-like unit are cored for liquid cooling. As shown in Fig. 2, however, the cylinder and its extension are constructed for air cooling and the cylinder is not fitted with a liner. In both figures a gas sealing ring 25 is shown fitted on the plug-like unit and engaging the socket in which the unit with its ring may move like a piston whilst maintaining a gas seal.

In use, the body of the plug-like unit 16 is forced downwardly to its normal position by the spring 23 and the rotary valve member is so mounted that such spring effort provides a load on the complementary gas sealing surfaces to maintain gas sealing relation between the valve and its seating. Gaseous pressures in the cylinder will cause the rotary valve member to be forced upwardly and the anti-friction thrust bearing to yield thereto, but the pressure between the coacting conical gas sealing surfaces of the rotary valve member and its seating cannot, in spite of the resultant axial movement of the rotary valve member towards its seating, exceed the pressure which is determined by the spring 23 as any excess of pressure will also move the plug-like unit against the resistance of the spring. Obviously, the yield of the thrust bearing will normally be only very small and the order perhaps of tenths of thousandths of an inch, so that the plug-like member will only be required to move very little. The upstanding flange 14a will maintain a gas seal in spite of such movement.

The invention is obviously not limited to all the details of construction of the example above described, some of which may be modified without departing from the nature of the invention.

What I claim is:

1. A rotary valve for an internal combustion engine comprising a rotary member and a seating member therefor, with complementary gas sealing and bearing surfaces on the said rotary member and in the said seating member, thrust bearings for the rotary member supplementary to such complementary gas sealing and bearing surfaces, and a yieldable mounting for the said seating member including a resilient element to predetermine the maximum loading between the seating member and the rotary member, said seating member comprising a plug-like unit axially slidable in the end of the cylinder.

2. An internal combustion engine comprising a cylinder having an extension with a recess therein, a cover for said cylinder a plug-like cylinder head slidably mounted in the said extension, and provided with a conical valve seating surface, a rotary valve member mounted in the said seating surface, a bearing for the rotary valve member carried by the said cover, and a yieldable mounting for the said plug-like cylinder head including a resilient element predetermining the load between the rotary member and its seating.

3. An internal combustion engine comprising a cylinder having an extension with a recess therein, a cover for said cylinder a plug-like cylinder head slidably mounted in the said recess, and having a conical valve seating surface, a rotary valve member mounted in the said seating surface, a bearing for the rotary valve member carried by the said cover, and a yieldable mounting for the said plug-like cylinder head including a resilient element predetermining the load between the rotary member and its seating, and a gas sealing ring carried by said plug-like member, the latter being slidable in the said recess in the manner of a piston in a cylinder.

4. An internal combustion engine comprising a cylinder having an extension with a recess therein, a cover for said cylinder a plug-like cylinder head slidably mounted in the said recess, and having a conical valve seating surface, a rotary valve member mounted in the said seating surface, a bearing for the rotary valve member carried by the said cover, a yieldable mounting for the said plug-like cylinder head including a resilient element predetermining the load between the rotary member and its seating surface, and a liner in the cylinder having an annular extension and the seating member having a complementary recess to form a gas seal therewith.

5. An internal combustion engine comprising a cylinder having an extension with a recess therein, a cover for said cylinder a plug-like cylinder head slidably mounted in the recess of said extension, and having a conical valve seating surface, a rotary valve member mounted in the said seating surface, a bearing for the rotary valve member carried by the said cover, and a yieldable mounting for the said plug-like cylinder head including a resilient element predetermining the load between the rotary member and its seating surface, said recess of the extension and said plug-like member having at least one registering port complementary to a port in the rotary valve member.

6. A rotary valve assembly for an internal combustion engine comprising a valve seating and a rotary valve member mounted therein having complementary bearing and gas-sealing surfaces and in which the said rotary valve member is subjected to thrust in a direction to load the said complementary surfaces, in combination a thrust bearing for the said rotary valve member and resilient means permitting yielding movement of the said valve seating relative to the rotary valve member in the direction of such thrust.

7. A rotary valve assembly for an internal combustion engine comprising a valve housing at the end of the engine cylinder, a thrust bearing carried by said housing, a rotary valve member supported in the said thrust bearing and having a tapered external bearing and gas-sealing surface and arranged with its larger end towards the engine cylinder, a valve seating member slidably mounted in the said housing having a tapered internal bearing and gas-sealing surface complementary to the external surface of the rotary valve member and a resilient element engaging the said seating member to press it yieldably against the rotary valve member and thus predetermine the load at the said complementary tapered bearing and gas-sealing surfaces.

FRANK METCALF ASPIN.